US008523519B2

(12) United States Patent
Breitenbach et al.

(10) Patent No.: US 8,523,519 B2
(45) Date of Patent: Sep. 3, 2013

(54) STEAM TURBINE ROTOR AND ALLOY THEREFOR

(75) Inventors: Steven Louis Breitenbach, Scotia, NY (US); Deepak Saha, Guilderland, NY (US)

(73) Assignee: General Energy Company, Schenectady, NY (US)

( * ) Notice: Subject to any disclaimer, the term of this patent is extended or adjusted under 35 U.S.C. 154(b) by 868 days.

(21) Appl. No.: 12/565,813

(22) Filed: Sep. 24, 2009

(65) Prior Publication Data

US 2011/0070088 A1 Mar. 24, 2011

(51) Int. Cl.

| | |
|---|---|
| ***F03D 11/00*** | (2006.01) |
| ***F01D 25/00*** | (2006.01) |
| ***F03B 11/00*** | (2006.01) |
| ***F04D 29/04*** | (2006.01) |
| ***C22C 38/22*** | (2006.01) |
| ***C22C 38/08*** | (2006.01) |
| ***C22C 38/00*** | (2006.01) |
| ***C22C 38/12*** | (2006.01) |
| ***C22C 38/44*** | (2006.01) |

(52) U.S. Cl.
USPC ........ 415/216.1; 418/106; 418/119; 418/121; 418/124; 148/335

(58) Field of Classification Search
USPC .............. 415/200, 216.1; 420/119, 121, 124, 420/106; 148/330, 334, 335
See application file for complete search history.

(56) References Cited

U.S. PATENT DOCUMENTS

| | | | | |
|---|---|---|---|---|
| 3,607,238 | A | 9/1971 | Ridal et al. | |
| 3,615,370 | A * | 10/1971 | Ridal et al. | 420/106 |
| 4,584,032 | A | 4/1986 | Isokawa et al. | |
| 4,855,106 | A * | 8/1989 | Katsumata et al. | 420/109 |
| 6,419,453 | B2 * | 7/2002 | Fukui et al. | 416/241 R |
| 6,569,269 | B1 | 5/2003 | Fujita et al. | |
| 6,755,920 | B2 | 6/2004 | Kamada et al. | |
| 6,773,519 | B2 | 8/2004 | Fujita et al. | |
| 6,962,483 | B2 * | 11/2005 | Ganesh et al. | 415/200 |
| 2006/0216145 | A1 * | 9/2006 | Arai et al. | 415/200 |
| 2007/0224041 | A1 | 9/2007 | Kawanaka et al. | |
| 2010/0147247 | A1 * | 6/2010 | Qiao et al. | 123/188.3 |

FOREIGN PATENT DOCUMENTS

| | | | |
|---|---|---|---|
| EP | 1123984 | A2 | 8/2001 |
| EP | 1275745 | | 1/2003 |
| JP | 59226152 | A | 12/1984 |
| JP | 62192536 | A | 8/1987 |
| JP | 63145750 | A | 6/1988 |
| JP | 5230599 | A | 9/1993 |

OTHER PUBLICATIONS

The EP Search Report and Opinion issued in connection with corresponding EP Application No. 10175170.9 on Dec. 27, 2010.
H. Everson, J. Orr, D. Dulieu, "Low Alloy Ferritic Bolting Steels for Steam Turbine Applications: the Evolution of the Durehete Steels", Technical Paper, pp. 1-13, Corus Engineering Steels.

* cited by examiner

*Primary Examiner* — Nathaniel Wiehe
*Assistant Examiner* — Su Htay
(74) *Attorney, Agent, or Firm* — Ernest G. Cusick; Gary M. Hartman; Domenica N. S. Hartman

(57) ABSTRACT

An alloy suitable for use in a rotor, such as one or more regions of a steam turbine rotor, as well as a forged rotor formed with the alloy. The alloy consists of, by weight, 0.20 to 0.30% carbon, 0.80 to 1.5% chromium, 0.80 to 1.5% molybdenum, 0.50 to 0.90% vanadium, 0.30 to 0.80% nickel, 0.05 to 0.15% titanium, 0.20 to 1.0% manganese, and 0.005 to 0.012% boron, the balance iron, optionally low levels of other alloying constituents, and incidental impurities.

20 Claims, 1 Drawing Sheet

STEAM TURBINE ROTOR AND ALLOY THEREFOR

BACKGROUND OF THE INVENTION

The present invention generally relates to turbine rotors, including those used in steam turbines. More particularly, this invention relates to an alloy suitable for use in high pressure and intermediate pressure stages of a steam turbine rotor and capable of increasing high temperature properties of such a rotor.

Rotors used in steam turbines, gas turbines, gas turbine engines and jet engines experience a range of operating conditions along their axial lengths. The different operating conditions complicate the selection of a suitable rotor material and the manufacturing of the rotor because a material optimized to satisfy one operating condition may not be optimal for meeting another operating condition. For instance, the inlet and exhaust areas of a steam turbine rotor have different material property requirements. High temperature and high pressure conditions within a high pressure (HP) stage at the inlet of a steam turbine typically require a material with high creep rupture strength, though only relatively moderate toughness. On the other hand, a low pressure (LP) stage at the exhaust of a steam turbine does not demand the same level of high temperature creep strength, but suitable materials typically must exhibit very high toughness because of the high loads imposed by long turbine blades used in the exhaust area.

Because a monolithic (monoblock) rotor (i.e., a rotor that is not an assembly) of a single chemistry cannot meet the property requirements of each of the LP, IP and HP stages for the reasons discussed above, rotors constructed by assembling segments of different chemistries are widely used. For example, large steam turbines typically have a bolted construction made up of separate rotor segments contained in separate shells or hoods for use in different sections of the turbine. The steam turbine industry currently favors CrMoV low alloy steels (typically, by weight, about 1% chromium, 1% molybdenum, 0.25% vanadium, up to 0.3% carbon, the balance iron and possibly lesser additions of silicon, manganese, etc. for use in the HP stage and NiCrMoV low alloy steels for use in the LP stage. NiMoV low alloy steels have also been widely used as materials for the various stages. A particular example of a CrMoV alloy contains, by weight, 1.0 to 1.5% chromium, 1.0 to 1.5% molybdenum, 0.2 to 0.3% vanadium, 0.25 to 0.35% carbon, 0.25 to 1.00% manganese, 0.2 to 0.75% nickel, up to 0.30% silicon, the balance iron and incidental impurities, for example, up to 0.010% phosphorous, up to 0.010% sulfur, up to 0.010% tin, up to 0.020% arsenic, and up to 0.015% aluminum.

While rotors fabricated from CrMoV low alloy steel compositions are widely used, the current maximum design temperature for CrMoV steels is about 1050° F. (about 565° C.). As higher inlet temperatures are sought, for example up to about 1065° F. (about 575° C.), to increase steam turbine efficiencies, chromium steel alloys (typically about 9 to 14 weight percent chromium) with varying levels of Mo, V, W, Nb, B must typically be used to meet the higher temperature conditions in the HP stage of the steam turbine. While capable of operating at temperatures exceeding 565° C. within the HP stage of a steam turbine, rotor forgings produced from these alloys incur higher costs and additional measures are often required to address thermal expansion mismatches with alloys used in the cooler stages of the rotor.

Modifications to CrMoV low alloy steels have been made to achieve desired properties for various other applications. For example, CrMoV bolting steels used in steam turbine applications may include additions of aluminum, boron and/or titanium to improve high temperature strength and ductility. Examples include alloys designated as 7 CrMoVTiB 10-10 and 20 CrMoVTiB 4-10. One such bolt alloy composition has been reported to contain, by weight, 0.9 to 1.2% chromium, 0.9 to 1.1% molybdenum, 0.6 to 0.8% vanadium, 0.35 to 0.75% manganese, 0.17 to 0.23% carbon, 0.07 to 0.15% titanium, 0.015 to 0.080% aluminum, 0.001 to 0.010% boron, up to 0.20% nickel, up to 0.40% silicon, up to 0.020% phosphorous, up to 0.020% sulfur, up to 0.020% tin, up to 0.020% arsenic, the balance iron. A particular commercial example is available from Corus Engineering Steels under the name Durehete 1055, and has been reported to contain, by weight, 1% chromium, 1% molybdenum, 0.7% vanadium, 0.5% manganese, 0.25% silicon, 0.2% carbon, 0.1% titanium, 0.04% aluminum, 0.003% boron, the balance iron. Boron has been reported to stabilize $V_4C_3$ carbides that serve as a strengthening phase in bolts formed of CrMoV alloys, and titanium has been reported to remove nitrogen from solution to prevent the formation of boron nitride precipitates. However, it is believed that boron has found limited use and titanium has not been used as additives to CrMoV alloys from which rotors are forged. Furthermore, forged steam turbine rotors have vastly different property requirements relative to bolts used in steam turbine applications, for example, to hold two rotor sections together or to hold the two shell halves together for steam containment.

BRIEF DESCRIPTION OF THE INVENTION

The present invention provides an alloy suitable for use in a rotor, for example, one or more regions of a steam turbine rotor, as well as a forged rotor formed with the alloy. In particular, the present invention involves modifications to a CrMoV low alloy steel to promote high temperature properties that enable a rotor formed therefrom to exhibit improved properties, for example, creep resistance, for use in the high pressure stage of a steam turbine.

According to one aspect of the invention, the alloy, consists of (by weight) 0.20 to 0.30% carbon, 0.80 to 1.5% chromium, 0.80 to 1.5% molybdenum, 0.50 to 0.90% vanadium, 0.30 to 0.80% nickel, 0.05 to 0.15% titanium, 0.20 to 1.0 manganese, and 0.005 to 0.012% born, the balance iron, optionally low levels of other alloying constituents, and incidental impurities. The alloy may be applied to the steam turbine applications such as high pressure (HP) rotors that require a monoblock forging, intermediate pressure (IP) rotors that require a monoblock forging, and combination HP-IP Rotors that require a monoblock forging. The alloy is also suitable for use as a HP or IP rotor section attached (for example, bolted or welded) to a low pressure (LP) rotor section formed of a different alloy composition.

Another aspect of the invention is a turbine rotor having at least a portion forged from the alloy described above. Though the chemistry of the alloy is similar to CrMoV bolting alloys containing titanium and boron, the latter were developed for bolting applications where smaller diameter bar stock is required bolting alloys, whereas the chemistry and heat treatment of the present alloy are modified for the production of large diameter forgings capable of addressing HP and IP rotor application requirements.

A significant advantage of this invention is that the alloy is capable of exhibiting increased creep strength and improved microstructure stability at temperatures above 1050° F. (about 565° C.), for example up to about 1065° F. (about 575° C.), relative to conventional CrMoV alloys. As a result, higher HP inlet temperatures are possible that can achieve enhanced steam turbine performance and efficiencies without having to resort to significantly higher costs associated with alloys such as 9-12% chromium heat resistant alloys. Furthermore, by avoiding the use of 9-12% chromium alloys and other alloys having coefficients of thermal expansion different from conventional CrMoV alloy steels, forgings produced from the alloy of this invention can be utilized in the service market as part of a retrofit package for performance enhancement of existing steam turbine units, as well as in new steam turbine designs.

Other aspects and advantages of this invention will be better appreciated from the following detailed description.

DETAILED DESCRIPTION OF THE INVENTION

Figure 1:
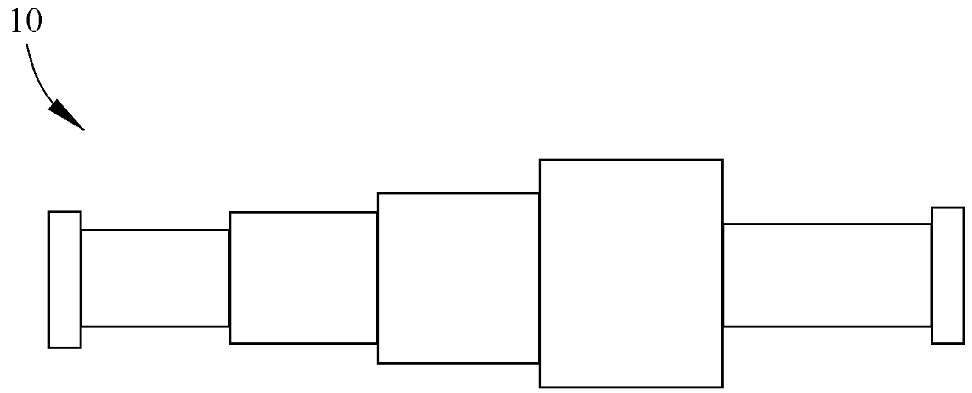
FIG. 1 schematically represents a monoblock steam turbine rotor forging that can be produced with an alloy of the present invention.

The present invention pertains to an alloy suitable for use in a steam turbine applications, such as a monoblock (one-piece) rotor forging 10 of the type represented in FIG. 1. Steam turbine monoblock rotor forgings of the type represented in FIG. 1 can be produced using standard ingot melting/casting techniques, for example, basic electric, electric arc, ladle refining, vacuum stream degassing, vacuum carbon deoxidation (VCD), vacuum silicon deoxidation (VSD), or a consumable electrode melting technique such as electroslag remelting (ESR), or vacuum arc remelting (VAR). In addition, the alloy may be used in the production of multiple alloy monoblock (one-piece) rotor forgings, for example, in accordance with the teachings of U.S. Pat. Nos. 6,962,483 to Schwant et al., 6,971,850 to Ganesh et al., and 7,065,872 to Ganesh et al., the contents of which relating to the casting and forging of multiple alloy monoblock rotors are incorporated herein by reference.

Figure 2:
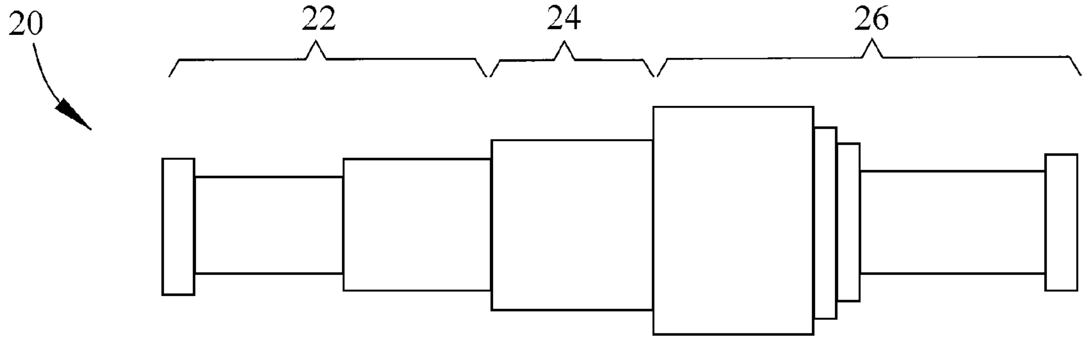
FIG. 2 schematically represents a steam turbine rotor comprising a HP rotor forging attached, such as bolted or welded, to a LP rotor forging formed of a different material.

Alternatively, it is foreseeable that the alloy could be utilized to produce a HP or IP rotor forging section, which may be either bolted or welded to a LP rotor forging section or another HP rotor forging section of another material to produce a combination steam turbine rotor assembly 20 of the type represented in FIG. 2. To achieve properties suitable for different stages of a steam turbine, for example, an advanced power generation steam turbine, different alloy chemistries are preferably used to form different portions of the rotor assembly 20 in FIG. 2. For example, different alloys could be used in the high pressure (HP) section 22, intermediate pressure (IP) section 24, and low pressure (LP) section 26. Alloys for the rotor assembly 20 of FIG. 2 are preferably selected to have mechanical and physical properties that are optimized for their respective locations within the steam turbine. As such, compositions for the HP, IP and LP alloys will often be different, though substantially uniform within their respective regions, to obtain the different properties required for the different sections 22, 24 and 26 of the rotor assembly 20, such as tensile strength, fracture toughness, rupture strength, creep strength, and thermal stability, as well as cost targets. Notable commercial alloys suitable for use in the LP section 26 of the rotor assembly 20 include conventional NiCrMoV-type low alloy steels, and notable commercial alloys for the HP and IP sections 22 and 24 of the rotor assembly 20 for applications up to 1050° F. include conventional CrMoV alloy steels.

To achieve mechanical properties necessary for the monoblock rotor forging 10 of FIG. 1 and the HP and/or IP rotor sections 22 and 24 of FIG. 2 to be capable of operating at inlet temperatures of greater than 1050° F. (about 565° C.), for example to about 1065° F. (about 575° C.), the chemistry of the alloy is based on a CrMoV low alloy steel whose composition is tailored to improve properties at these higher temperatures. In particular, the steel alloy has a composition of, by weight, 0.20 to 0.30% carbon, 0.80 to 1.5% chromium, 0.8 to 1.5% molybdenum, 0.50 to 0.90% vanadium, 0.30 to 0.80% nickel, 0.05 to 0.15% titanium, 0.20 to 1.0% manganese, and 0.005 to 0.012% boron, the balance iron, optionally low levels of other alloying constituents, and incidental impurities, for example, up to 0.008% phosphorous, up to 0.010% sulfur, up to 0.008% tin, up to 0.015% arsenic, and up to 0.015% aluminum. A more particular composition for the alloy is, by weight, 0.20 to 0.25% carbon, 0.90 to 1.3% chromium, 1.0 to 1.5% molybdenum, 0.60 to 0.80% vanadium, 0.30 to 0.60% nickel, 0.07 to 0.12% titanium, 0.65 to 0.85% manganese, 0.005 to 0.010% boron, the balance iron and incidental impurities. A suitable targeted composition for the alloy is believed to be, by weight, about 1.1% chromium, 1.25% molybdenum, 0.7% vanadium, 0.25% carbon, 0.11% titanium, 0.009% boron, 0.75% manganese, 0.50% nickel, the balance iron and incidental impurities.

The alloy is believed to provide advantages when used in a forged rotor, and particularly the HP region and optionally the IP region of a steam turbine rotor. For example, the inclusion of both boron and titanium is believed to promote microstructure stabilization at temperatures above 1050° F. (about 565° C.), for example up to about 1065° F. (about 575° C.) and possibly higher, providing an increase in creep strength relative to conventional CrMoV alloys. Though appearing to be a rather minor increase of up to about 15° F. (about 10° C.), such an increase in HP inlet design temperature would be able to achieve enhanced steam turbine performance and efficiencies without having to resort to significantly higher costs associated with other alloys, such as 9-12% chromium heat resistant alloys. Furthermore, by avoiding the use of 9-12% chromium alloys and other alloys whose coefficients of thermal expansion are different from conventional CrMoV alloy steels, forgings produced from the alloy of this invention can be utilized in the service market as part of a retrofit package for performance enhancement of existing steam turbine units, as well as in new steam turbine designs.

The alloy described above is based on a nominal 1% CrMoVTiB alloy previously applied only to steam bolting applications. Relative to steam bolting applications, rotor forging applications require the production of forgings with significantly greater diameters. For example, HP and IP rotor forgings are typically manufactured with a maximum diameter for the final forging in the range of about twenty to about forty-eight inches (about 50 to about 120 cm). Consequently, the nominal 1% CrMoVTiB chemistry for bolting applications was necessarily tailored for the production of larger diameter rotor forgings. For example, the target manganese level was increased to improve the hardenability of the alloy, the target nickel level was increased to improve the hardenability and fracture toughness of the alloy, and the target aluminum level was decreased to avoid the formation oxides that would be retained in the final product.

As previously noted, the alloy of this invention is adapted to be cast and forged to form a monoblock (one-piece) HP or IP rotor forging 10 of the type shown in FIG. 1, and foreseeably one or both of the HP and IP sections 22 and 24 of the multiple alloy rotor assembly 20 of FIG. 2. After forging, the monoblock forging 10 of FIG. 1 or the forging sections 22 and 24 of FIG. 2 may be subjected to one or more heat treatments. For example, the forging may undergo two heat treatment steps: a preliminary heat treatment step and final heat treatment step. The preliminary heat treatment is designed to refine the microstructure and entails a normalizing treatment in the temperature range of about 1700° F. to about 1900° F. (about 930° C. to about 1040° C.), followed by air cooling. The final heat treatment step is designed to generate the final material properties, and entails an austenitizing step during which the forging is heated to a temperature in the range of about 1650° F. to about 1850° F. (about 900° C. to about 1010° C.), held for sufficient time to ensure complete through-thickness transformation to austenite, and then quenched to a sufficient temperature and at a sufficient rate to ensure complete transformation of the microstructure from the austenite phase to the bainite phase. Following heat treatment, the rotor forging preferably has a maximum grain size of about ASTM 3 or finer and can be machined to produce the shape and dimensions required for the rotor.

If the alloy of this invention is used to form multiple regions of the rotor forging 10, for example, in accordance with the aforementioned U.S. patents to Schwant et al. and Ganesh et al., different heat treatment temperatures and durations may be used if deemed desirable or necessary. For example, a furnace with multiple temperature zones may be used to provide an appropriate heat treatment temperature for regions of the rotor forging corresponding to the different regions of the rotor forging 10. As understood in the art, such differential heat treatments may include different temperatures for solution, austenitizing, aging and/or tempering treatments that may be performed on the rotor forging. For example, a higher temperature austenitizing treatment may be used if higher creep rupture strength is desired for the HP region, while relatively lower temperatures may be used if higher toughness is needed for the IP or LP regions. Differential cooling after austenitizing may also be used. For example, relatively slow cooling may be used to achieve beneficial precipitation reactions, reduce thermal stresses, and/or enhance creep rupture strength in the HP region, whereas more rapid cooling may be used to achieve full section hardening, avoid harmful precipitation reactions, and/or enhance toughness for the IP or LP regions. Optimal temperatures, durations, and heating and cooling rates will generally be within the capability of one skilled in the art.

While the invention has been described in terms of particular embodiments, it is apparent that other forms could be adopted by one skilled in the art. Therefore, the scope of the invention is to be limited only by the following claims.

The invention claimed is:

1. An alloy adapted for forming at least a portion of a forged turbine rotor, the alloy consisting of, by weight, 0.20 to 0.30% carbon, 0.80 to 1.3% chromium, 0.80 to 1.5% molybdenum, 0.50 to 0.90% vanadium, 0.30 to 0.80% nickel, 0.05 to 0.15% titanium, 0.20 to 1.0% manganese, and 0.005 to 0.012% boron, the balance iron and incidental impurities.

2. The alloy according to claim 1, wherein the chromium content of the alloy is 0.90 to 1.3 weight percent.

3. The alloy according to claim 1, wherein the molybdenum content of the alloy is 1.0 to 1.5 weight percent.

4. The alloy according to claim 1, wherein the vanadium content of the alloy is 0.60 to 0.80 weight percent.

5. The alloy according to claim 1, wherein the carbon content of the alloy is 0.20 to 0.25 weight percent.

6. The alloy according to claim 1, wherein the titanium content of the alloy is 0.07 to 0.12 weight percent.

7. The alloy according to claim 1, wherein the boron content of the alloy is 0.005 to 0.010 weight percent.

8. The alloy according to claim 1, wherein the manganese content of the alloy is 0.65 to 0.85 weight percent.

9. The alloy according to claim 1, wherein the nickel content of the alloy is 0.30 to 0.60 weight percent.

10. The alloy according to claim 1, wherein the alloy consists of carbon, chromium, molybdenum, vanadium, nickel, titanium, manganese, boron, iron, and incidental impurities.

11. A turbine rotor having at least a first portion forged from the alloy according to claim 1.

12. The turbine rotor according to claim 11, wherein the rotor is formed of a monoblock rotor forging formed entirely by the alloy.

13. The turbine rotor according to claim 11, wherein the first portion comprises a high pressure region of the rotor.

14. The turbine rotor according to claim 11, wherein the first portion comprises an intermediate pressure region of the rotor.

15. The turbine rotor according to claim 11, wherein the first portion comprises high and intermediate pressure regions of the rotor.

16. The turbine rotor according to claim 11, wherein the alloy consists of, by weight, 0.90 to 1.3% chromium, 1.0 to 1.5% molybdenum, 0.60 to 0.80% vanadium, 0.20 to 0.25% carbon, 0.07 to 0.12% titanium, 0.005 to 0.010% boron, 0.65 to 0.85% manganese, 0.30 to 0.60% nickel, up to 0.25% silicon, the balance iron and incidental impurities.

17. The turbine rotor according to claim 11, wherein the turbine rotor is a steam turbine rotor.

18. An alloy adapted for forming at least a portion of a forged steam turbine rotor, the alloy consisting of, by weight, 0.90 to 1.3% chromium, 1.0 to 1.5% molybdenum, 0.60 to 0.80% vanadium, 0.20 to 0.25% carbon, 0.07 to 0.12% titanium, 0.005 to 0.010% boron, 0.65 to 0.85% manganese, 0.30 to 0.60% nickel, up to 0.25% silicon, up to 0.008% phosphorous, up to 0.010% sulfur, up to 0.008% tin, up to 0.015% arsenic, and up to 0.015% aluminum, the balance iron and incidental impurities.

19. A steam turbine rotor having at least a first portion forged from the alloy according to claim 18.

20. The steam turbine rotor according to claim 19, wherein the first portion comprises at least one of a high pressure region and an intermediate pressure region of the rotor.

* * * * *